United States Patent
Roehm et al.

(10) Patent No.: US 7,461,514 B2
(45) Date of Patent: Dec. 9, 2008

(54) METHOD FOR ENERGY MANAGEMENT OF AIR-CONDITIONING UNITS

(75) Inventors: Rolf Roehm, Jettingen (DE); Bernd Seiler, Stuttgart (DE)

(73) Assignee: Daimler AG, Stuttgart (DE)

( * ) Notice: Subject to any disclaimer, the term of this patent is extended or adjusted under 35 U.S.C. 154(b) by 627 days.

(21) Appl. No.: 10/537,257

(22) PCT Filed: Nov. 5, 2003

(86) PCT No.: PCT/EP03/12301

§ 371 (c)(1),
(2), (4) Date: Oct. 25, 2005

(87) PCT Pub. No.: WO2004/050402

PCT Pub. Date: Jun. 17, 2004

(65) Prior Publication Data

US 2006/0162352 A1 Jul. 27, 2006

(30) Foreign Application Priority Data

Dec. 2, 2002 (DE) ................................ 102 56 410

(51) Int. Cl.
*B60H 1/32* (2006.01)
*F25B 1/00* (2006.01)
*G05B 11/01* (2006.01)
*G05B 13/00* (2006.01)

(52) U.S. Cl. ............................ 62/133; 62/510; 62/244; 700/11; 700/12; 700/276

(58) Field of Classification Search .................. 62/133, 62/228.5, 510, 158, 244; 700/11, 12, 276, 700/28, 295
See application file for complete search history.

(56) References Cited

U.S. PATENT DOCUMENTS 4,614,089 A 9/1986 Dorsey (Continued)

FOREIGN PATENT DOCUMENTS

DE 19917811 A1 3/2000

(Continued)

OTHER PUBLICATIONS

Japanese office action with English translation (3 pages) and letter from Japanese associate with comments (3 pages).

*Primary Examiner*—Chen-Wen Jiang
(74) *Attorney, Agent, or Firm*—Crowell & Moring LLP

(57) ABSTRACT

A method for energy management of air-conditioning units in motor vehicles in which each of the air-conditioning units has a plurality of air-conditioning compressors prevents very heavy loading of an engine of a motor vehicle and prevents the engine from almost stalling when the air-conditioning compressors start up, as currently occurs during starting of the engine of the motor vehicle, after idling of the engine of the motor vehicle, and after an acceleration process in which the engine was in the full load mode. Each of the air-conditioning compressors is allocated a different priority, with the highest priority, for example, assigned to the air-conditioning compressor for a front vehicle region which is intended, inter alia, to prevent the front windscreen from misting up by removing moisture from the air. A lower priority can be assigned to the air-conditioning compressor for a rear vehicle region. If one of the states specified above is detected during determination of a state, each of the air-conditioning compressors is switched on but successively delayed by a predetermined switch-on delay time in accordance with this allocated priority in response to request signals. In contrast, deactivation can take place simultaneously.

19 Claims, 6 Drawing Sheets

U.S. PATENT DOCUMENTS

2003/0136138 A1 * 7/2003 Tsuboi et al. .............. 62/228.1

FOREIGN PATENT DOCUMENTS

| DE | 19960079 | A1 | 6/2000 |
| EP | 1179442 | A2 | 2/2002 |
| JP | 2002-532320 | A | 10/2002 |

* cited by examiner

METHOD FOR ENERGY MANAGEMENT OF AIR-CONDITIONING UNITS

BACKGROUND AND SUMMARY OF THE INVENTION

This invention relates to a method for energy management of air-conditioning units, in particular air-conditioning units having a plurality of air-conditioning compressors.

In passenger cars and trucks having an internal combustion engine or an electric drive and a plurality of air-conditioning units, at least one air-conditioning compressor is used to produce cold air for each cooling circuit. The air-conditioning compressors are actuated immediately by the starting of the internal combustion engine. This results in the internal combustion engine or electric drive being loaded very heavily by the starting up of the air-conditioning compressors and almost stalling.

German document DE 199 60 079 A1 discloses a method for switching various classes of loads on and off by means of switching elements within the scope of an energy management operation which is carried out by a control device in a motor vehicle. The various classes of loads have various priorities, but it is possible to adapt the prioritization of the loads during ongoing operation, with the adaptation also taking into account the perceptibility of the operating states caused by a switching over operation. In this conventional method, for example, the air-conditioning compressor or compressors are switched off in the acceleration phase as loads with the lowest priority in order to prevent a braking effect. When there is a change in state, the individual load cannot be transferred to a class with a lower priority than the class in which it is in the normal state, i.e. when sufficient supply of energy is ensured in the usual travel mode. The switching takes place in such a way that individual loads of one class are switched, and the switching either takes place successively, with adaptation to the load state, or in parallel if a plurality of loads have to be switched for compensation purposes, or the entire class if necessary.

However, this energy management is carried out with dynamic adaptation of the priorities of individual loads only during operation. There is no indication whatsoever that, when at least one previously deactivated load is started or restarted, particular problems occur as a result of the starting up loading by loads, for example when air-conditioning compressors startup and restartup, or how these problems could be solved.

The object of the present invention is therefore to configure a method for energy management of air-conditioning units which considerably reduces the loading on the internal combustion engine or electric drive when the air-conditioning compressors start up, which prevents stalling and which makes subsequent adjustment by the engine electronics as comfortable as possible.

This object is achieved according to the invention by a method for energy management in air-conditioning units having the claimed features. Advantageous developments of the invention are also specified in the claims.

As a result of the method according to the invention for energy management of air-conditioning units, better compensation of the idling stability of an internal combustion engine or drive takes place. The engine/drive operates in a more stable fashion. Fluctuations in rotational speed or switch-on judder when switching on coolant compressors are or is minimized. This allows user comfort to be increased.

This and further objects, features and advantages of the present invention become apparent from the following description of a preferred exemplary embodiment of the invention in conjunction with the drawings.

DETAILED DESCRIPTION OF THE INVENTION

The inventive method for energy management of air-conditioning units will be described below with reference to an illustration provided in FIGS. 1A to 1D for the sake of clarity.

In the inventive method for energy management of air-conditioning units, after the start in a step S1, definitions are made as to which coolant compressor has a high priority and which has a subordinate priority. For example, the air-conditioning compressor which is assigned to a front vehicle region is allocated a higher priority than the air-conditioning compressor which is assigned to a vehicle region so that after a start, moisture is firstly removed from the sucked-in air so that the front windscreen is prevented from misting up.

Then, in a second step S2 with the substeps S2a, S2b and S2c, it is determined whether a vehicle engine is started, the engine is in the idling mode or the engine or vehicle drive is in the full load mode, and an acceleration bit, by which the air-conditioning compressor has previously been switched off, is set.

If one of the conditions determined in steps S2a, S2b and S2c is fulfilled, energy management according to the invention is carried out (steps S4 to S20). If none of the conditions determined in steps S2a to S2c is fulfilled, a conventional air-conditioning unit regulating process is carried out (step S3).

The regulating sequences which respectively follow the determinations in steps 2a to 2c will be explained in detail below.

If it is detected in step S2a that the engine has been restarted, in a step S4, the air-conditioning compressor which is assigned to the front vehicle region, i.e. the air-conditioning compressor with the highest priority, is firstly actuated so that the front vehicle region conditions air as quickly as possible after the engine starts, i.e. removes the moisture from the sucked-in air, and misting up of the front windscreen is avoided. Then, in step S5 the air-conditioning compressor which is assigned to the rear vehicle region, i.e. the air-conditioning compressor with a lower priority, is actuated after a predefined time T. The predefined time T is here a time which is predefined by a design or size of the air-conditioning compressor or ambient temperature or a coolant pressure of, for example, 10 to 48 Nm which is necessary for the engine to compensate for the load which is added to the internal combustion engine/motor vehicle drive by the air-conditioning compressor. This predefined time T may be, for example, approximately 3 seconds.

However, if it is detected in step S2a that restarting of the engine has not occurred, the sequence continues to step S2b in which it is checked whether the engine is in the idling mode.

Figure 1A:
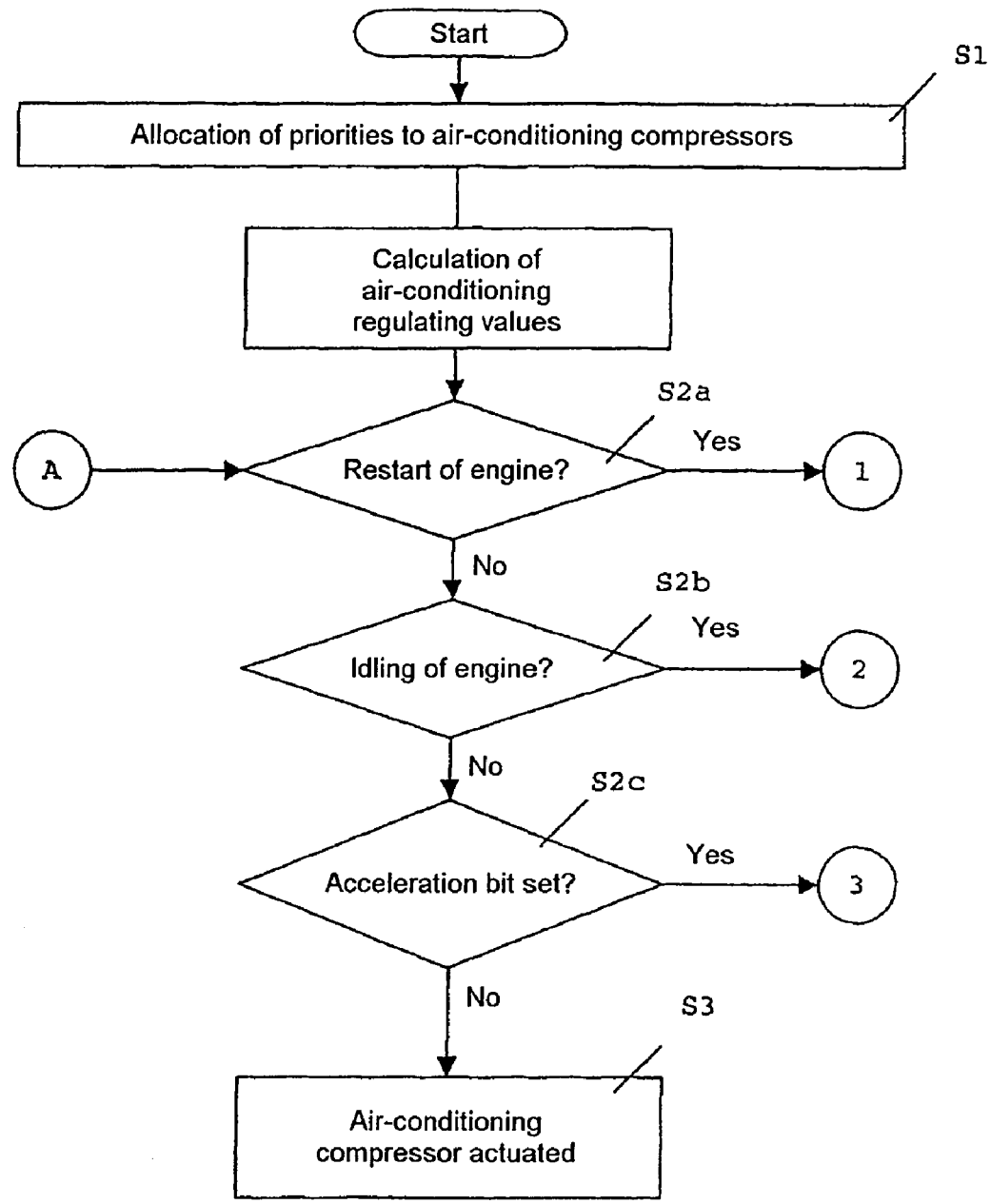
FIGS. 1A to 1D are flowcharts showing a method according to the invention for energy management of air-conditioning units.
Figure 1B:
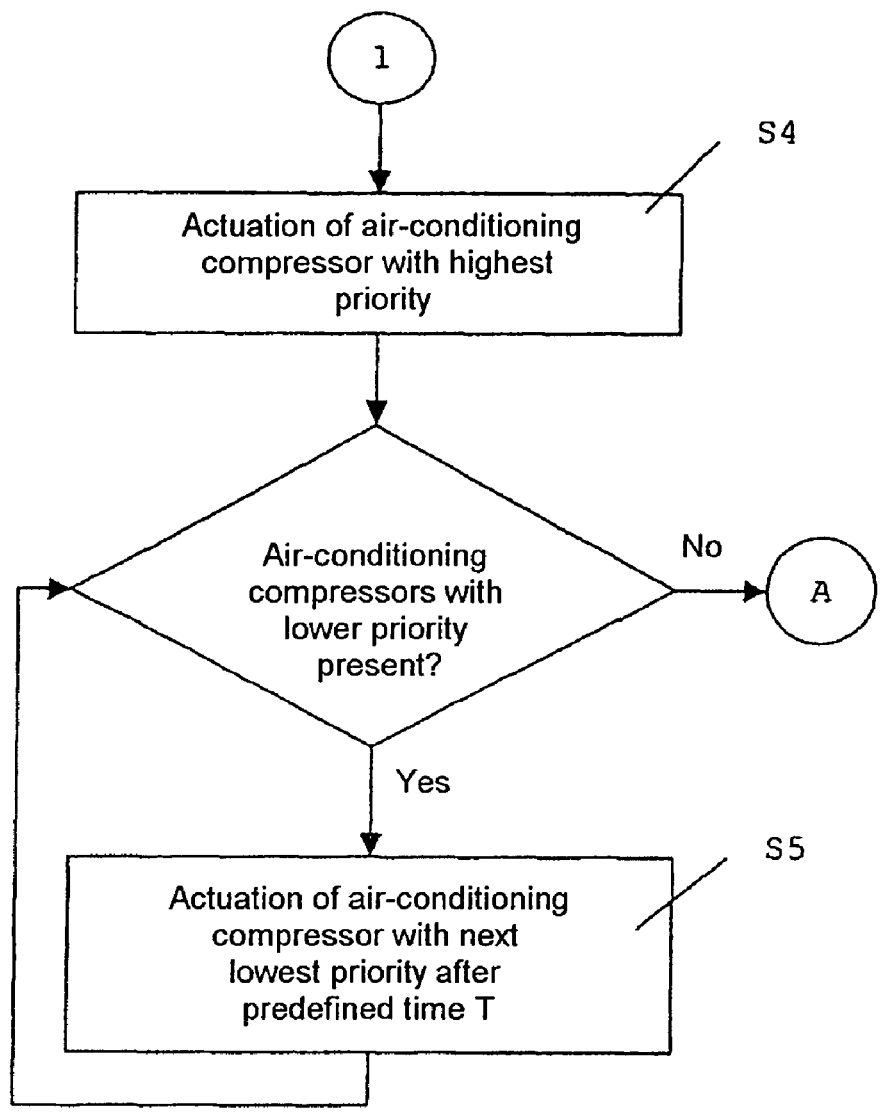
Figure 1C:
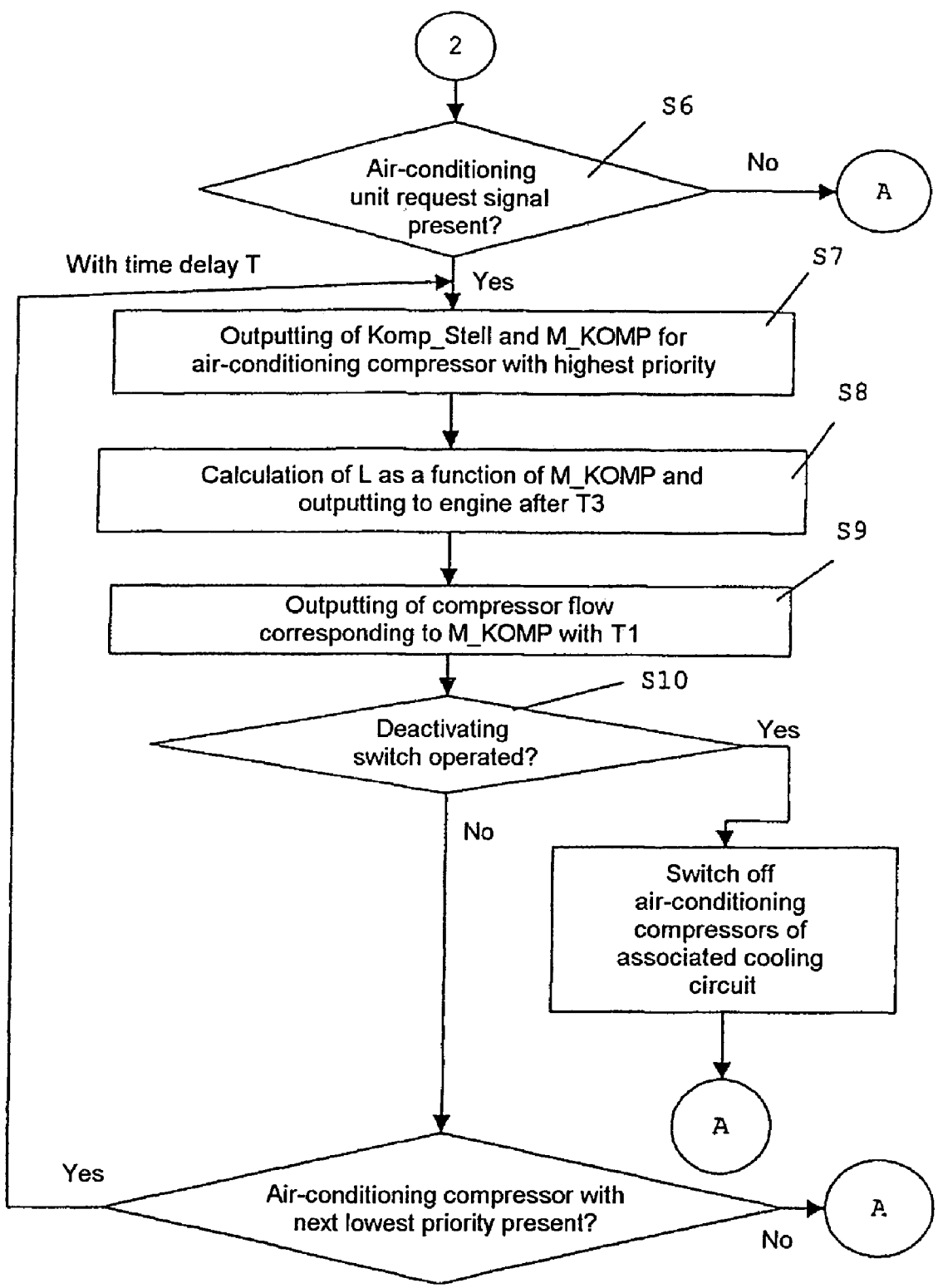
Figure 1D:
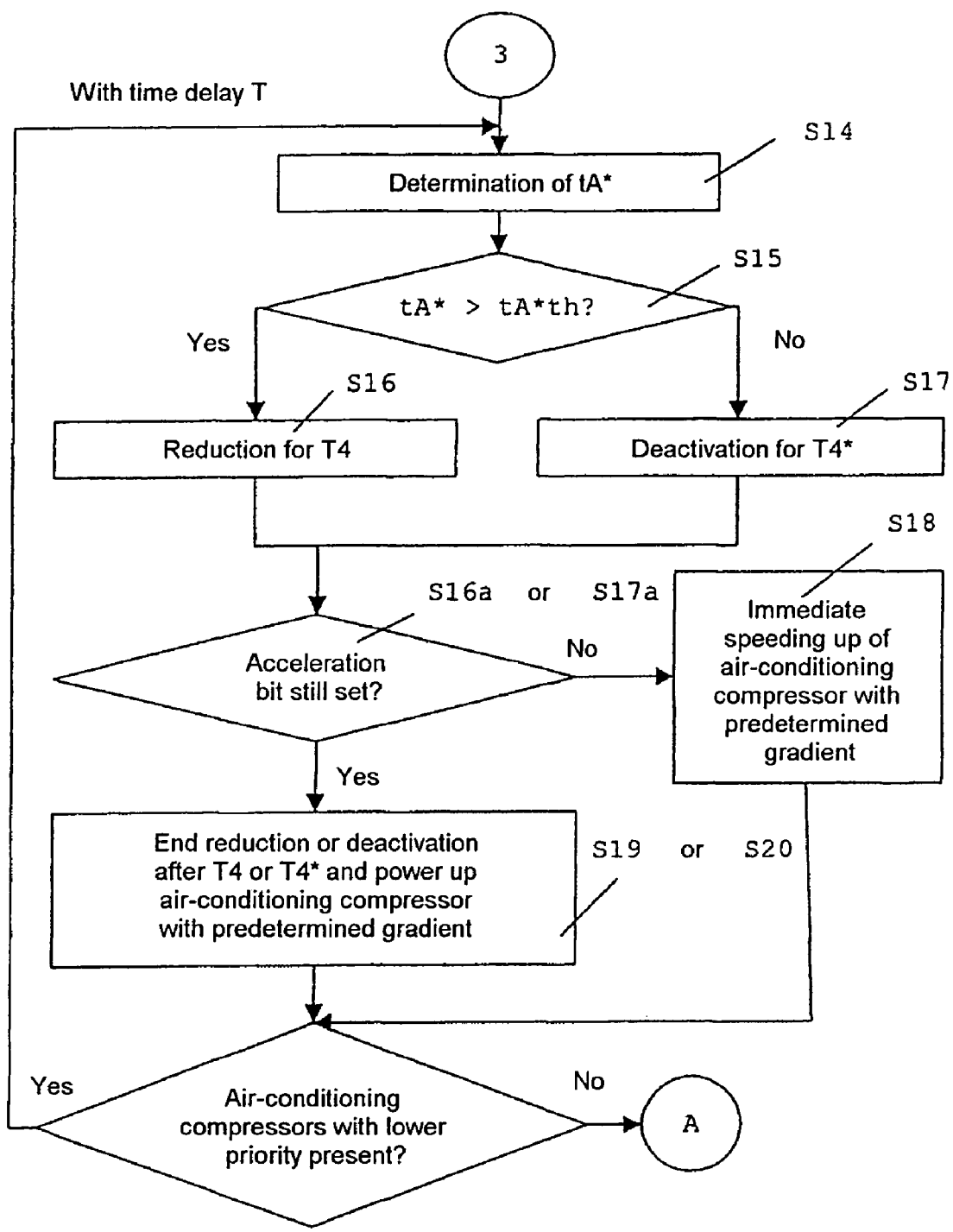
Figure 2:
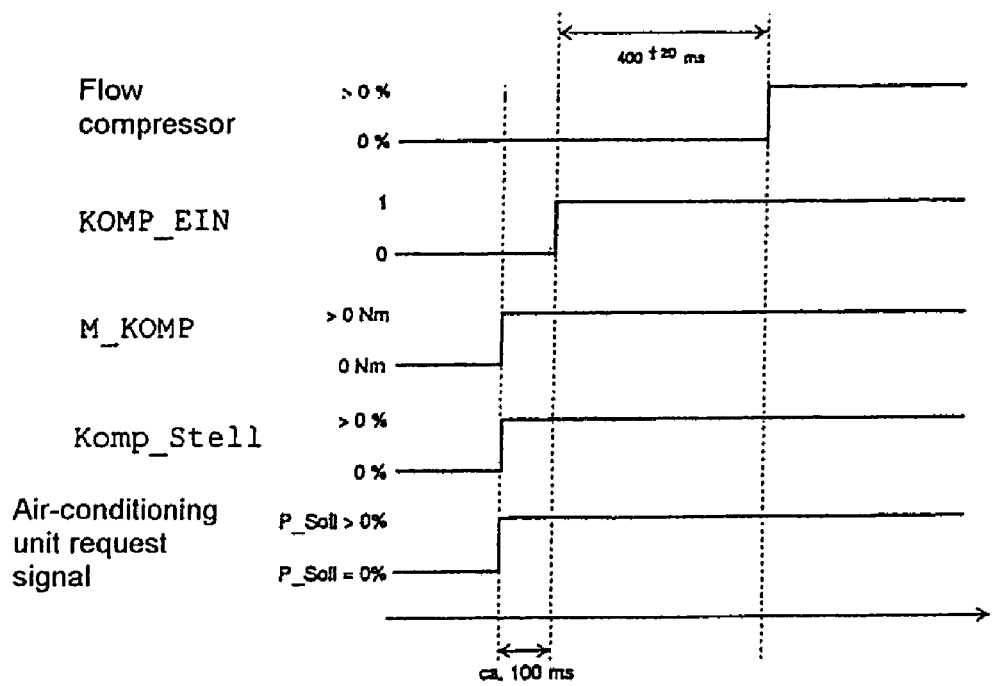
FIG. 2 shows an exemplary signal profile for switching an air-conditioning compressor on, FIG. 3 shows an exemplary signal profile for switching an air-conditioning compressor off.
Figure 3:
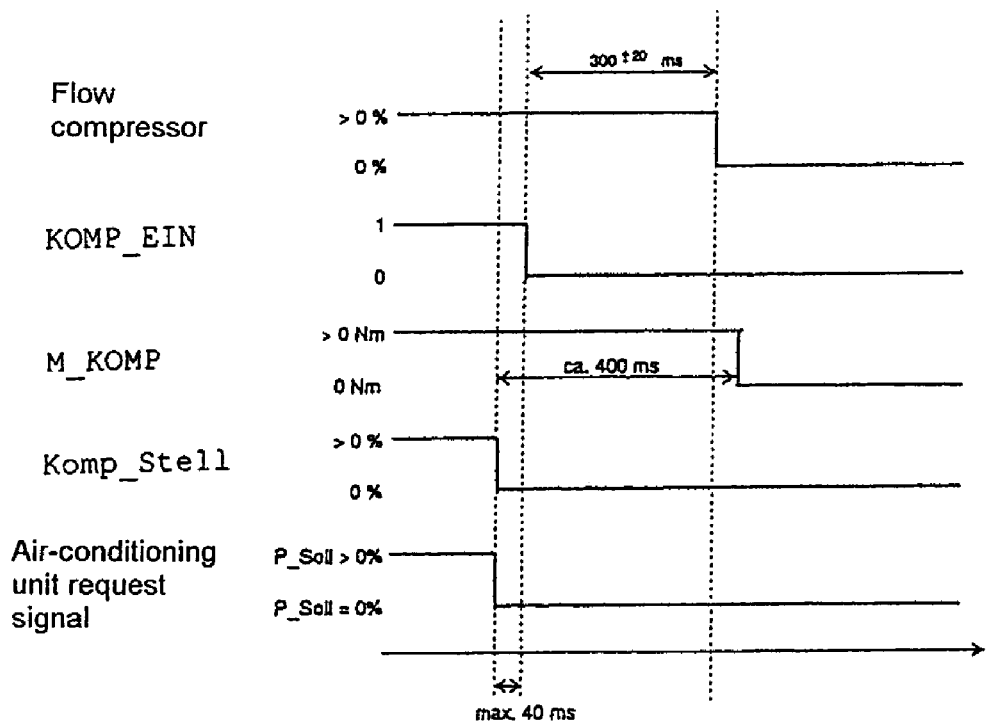

If it is detected in step S2b that the engine is in the idling mode, it is checked whether an air-conditioning unit request signal is present (step S6). If the air-conditioning unit request signal is present in step S6, an air-conditioning compressor actuating signal Komp_Stell and an anticipated air-conditioning compressor torque M_KOMP are simultaneously output to an engine control device on, for example, a CAN (step S7). In response to this air-conditioning compressor torque M_KOMP, the engine control device calculates, in step S8, a load increase signal L as a function of the air-conditioning compressor torque M_KOMP and outputs it to the engine after a predetermined time T3. A compressor flow which corresponds to the load increase signal L calculated in step S8 is output in step S9 with a switch-on delay time T1 by the engine to the air-conditioning compressor. In FIGS. 2 and 3, KOMP_EIN designates a compressor switch-on signal.

During the switch-on delay time T1, it is checked, in step S10, whether a deactivating switch, for example a manual switch, for deactivation of the air-conditioning unit has been operated. If the result of this checking in step S10 reveals that a deactivating switch has been operated, all the air-conditioning compressors of the associated cooling circuit are switched off. Then the system returns to step S2a. If the result in step S10 is that the deactivating switch has not been operated, it is checked whether an air-conditioning compressor with a lower priority is present. If that is the case, the system returns to step S7 with a time delay T. If not, the system returns to step S2a.

Then, after the predefined time T has expired the regulating process is carried out according to steps S6 to S10 for the air-conditioning compressor with the next lowest priority.

It is to be noted that if the air-conditioning compressors are switched off there is no need to differentiate between the different priorities; instead all the air-conditioning compressors can be switched off simultaneously, i.e. without the chronological offset, and without complying with the predefined time T.

Exemplary signal profiles for the switching on and switching off of an air-conditioning compressor are shown in FIGS. 2 and 3.

However, if the result in step S2b is that the engine is not in the idling mode, the sequence continues to step S2c. In step S2c it is checked whether an acceleration bit is set on the CAN bus. The setting of the acceleration bit is equivalent to a reduction in power of the air-conditioning compressor as a function of the external temperature, i.e. the power of the air-conditioning compressor is reduced at maximum for a predetermined time T4.

Figure 4A:
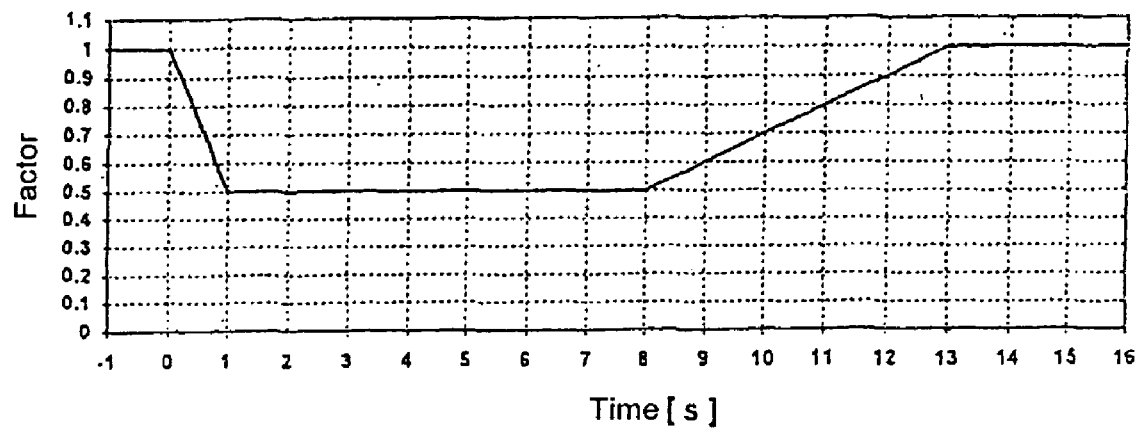
FIGS. 4a and 4b show exemplary profiles of a factor for reducing the power of the air-conditioning compressor.
Figure 4B:
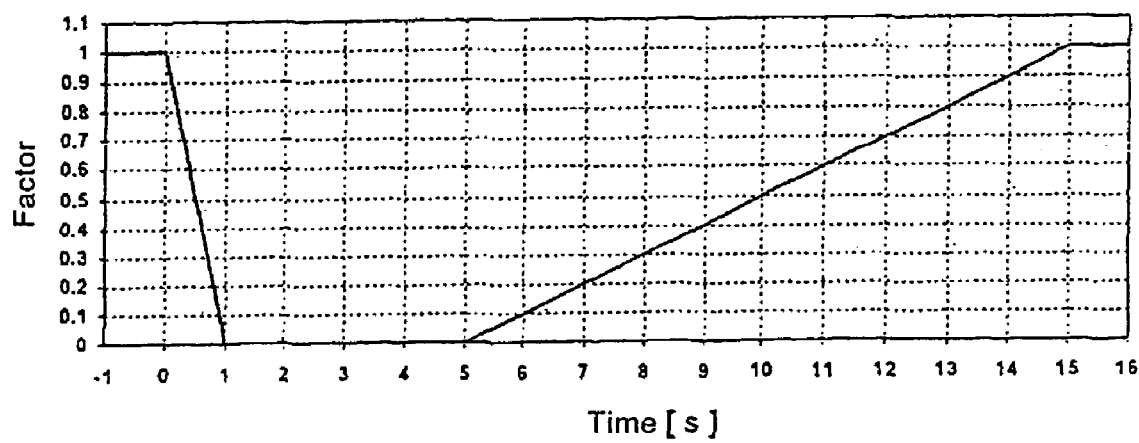

FIGS. 4a and 4b show the profile of a factor for reducing the power of the air-conditioning compressor if the acceleration bit is present at least for the time period T4 and T4*, depending on whether or not the external temperature is above or below a threshold value tA*th. For example, T4 may be 8 seconds in the case of an external temperature above a threshold value tA*th of, for example 25° C., while T4* is 5 seconds below the threshold value tA*th. If the acceleration bit is reset before expiration of the time period T4 or T4*, the speeding up of the air-conditioning compressor takes place immediately with the gradient shown in FIGS. 4a and 4b, depending on which external temperature tA* is present. Before the power can be switched off again or reduced, the air-conditioning compressor must have been switched on for at least a time period T5, with T5 being significantly longer than T4. T5 may be 20 seconds, for example.

After the step S2c, in a step S14, the external temperature tA* is determined and the sequence is continued to a step S15. In step S15 it is decided whether the external temperature tA* is above a predetermined threshold value tA*th. If it is above the threshold value tA*th, in step S16 the air-conditioning compressor is switched off over a time period T4, as shown in FIG. 4a, and otherwise it is switched off over a time period T4* (step S17). During the time period T4 or T4*, monitoring is carried out in step S16a or S17a to determine whether the acceleration bit is still set. If the acceleration bit is no longer set in step S16a or S17a, the air-conditioning compressor is speeded up immediately in step S18, with the gradient determined from FIG. 4a or 4b. If the acceleration bit is still set in step S16a or S17a, the deactivation is ended after the time period T4 or T4* in step S19 or S20 and the air-conditioning compressor is powered up again with the gradient shown in FIGS. 4a and 4b.

The steps S2c, S14 to S20 are repeated for the air-conditioning compressor with the next lowest priority.

The steps S2a to S2c can also be carried out in a changed sequence or simultaneously without departing from the basic idea of the invention.

In this way it is possible, by means of the inventive method for energy management of air-conditioning units in motor vehicles, to avoid switch-on judder or near stalling of the engine of the motor vehicle owing to the simultaneous switching on of a plurality of air-conditioning compressors.

To summarize, the present invention discloses a method for energy management of air-conditioning units in motor vehicles, in particular air-conditioning units having a plurality of air-conditioning compressors. The method according to the invention prevents very heavy loading of an engine of a motor vehicle and prevents the engine from almost stalling when the air-conditioning compressors start up, as currently occurs during starting of the engine of the motor vehicle, after idling of the engine of the motor vehicle as well as after an acceleration process in which the engine was in the full load mode. For this purpose, each of the air-conditioning compressors is allocated a different priority, for example the highest priority is assigned to the air-conditioning compressor for a front vehicle region which is intended, inter alia, to prevent the front windscreen misting up by removing moisture from the air, and a lower priority to the air-conditioning compressor for a rear vehicle region. If one of the states specified above is detected during a state interrogation, each switching on of the air-conditioning compressors is successively delayed by a predetermined switch-on delay time in accordance with this allocated priority in response to request signals. In contrast, deactivation can take place simultaneously.

The invention claimed is:

1. A method for energy management of an air-conditioning unit in a motor vehicle, the air-conditioning unit having a plurality of air-conditioning compressors, comprising:
    allocating priorities to each of at least two air-conditioning compressors of the air-conditioning unit,
    determining whether an engine of the motor vehicle is newly started, in the idling mode, or in a full load mode, and therefore an acceleration bit by which the air-conditioning compressors have been switched off is set,
    executing a conventional air-conditioning unit regulating process when the engine is not newly started, the engine is not in the idling mode, and the engine is not in the full load mode, and
    actuating the air-conditioning compressors in a priority sequence determined by the priorities allocated, with actuation of each of the air-conditioning compressors being offset by a time, when the engine is newly started, the engine is in the idling mode, or the engine is in the full load mode.

2. The method of claim 1, wherein the time is a respective predefined time which is dependent on at least one of a design, a size, an ambient temperature, and a coolant pressure of at least one of the air-conditioning compressors.

3. The method of claim 2, wherein the priorities are allocated in such a way that an air-conditioning compressor which is assigned to a front vehicle region has a higher priority than an air-conditioning compressor which is assigned to a rear vehicle region.

4. The method of claim 2, and further comprising checking whether an air-conditioning unit request signal is present when the engine is in the idling mode, simultaneously outputting an air-conditioning compressor actuating signal and an anticipated air-conditioning compressor torque to an engine control device when the air-conditioning unit request signal is present, calculating a load increase signal as a function of the air-conditioning compressor torque with the engine control device and outputting the load increase signal to the engine after a predetermined time, and outputting a compressor flow which corresponds to the load increase signal with a switch-on delay time by the engine to the air-conditioning compressor, firstly for an air-conditioning compressor with the highest priority, and then, after a predefined time, for an air-conditioning compressor with the next highest priority.

5. The method of claim 4, and further comprising checking whether a deactivating switch for deactivation of the air-conditioning unit has been operated during the switch-on delay time, switching off all the air-conditioning compressors of the associated cooling circuit and again determining whether the engine is newly started when the deactivating switch has been operated, and, otherwise, when an air-conditioning compressor with the next highest priority is present, again outputting the air-conditioning compressor actuating signal and the anticipated air-conditioning compressor torque to the engine control device.

6. The method of claim 1, wherein the time is a predefined time of approximately 3 seconds.

7. The method of claim 1, wherein the priorities are allocated in such a way that an air-conditioning compressor which is assigned to a front vehicle region has a higher priority than an air-conditioning compressor which is assigned to a rear vehicle region.

8. The method of claim 7, and further comprising checking whether an air-conditioning unit request signal is present when the engine is in the idling mode, simultaneously outputting an air-conditioning compressor actuating signal and an anticipated air-conditioning compressor torque to an engine control device when the air-conditioning unit request signal is present, calculating a load increase signal as a function of the air-conditioning compressor torque with the engine control device and outputting the load increase signal to the engine after a predetermined time, and outputting a compressor flow which corresponds to the load increase signal with a switch-on delay time by the engine to the air-conditioning compressor, firstly for an air-conditioning compressor with the highest priority, and then, after a predefined time, for an air-conditioning compressor with the next highest priority.

9. The method of claim 8, and further comprising checking whether a deactivating switch for deactivation of the air-conditioning unit has been operated during the switch-on delay time, switching off all the air-conditioning compressors of the associated cooling circuit and again determining whether the engine is newly started when the deactivating switch has been operated, and, otherwise, when an air-conditioning compressor with the next highest priority is present, again outputting the air-conditioning compressor actuating signal and the anticipated air-conditioning compressor torque to the engine control device.

10. The method of claim 1, and further comprising checking whether an air-conditioning unit request signal is present when the engine is in the idling mode, simultaneously outputting an air-conditioning compressor actuating signal and an anticipated air-conditioning compressor torque to an engine control device when the air-conditioning unit request signal is present, calculating a load increase signal as a function of the air-conditioning compressor torque with the engine control device and outputting the load increase signal to the engine after a predetermined time, and outputting a compressor flow which corresponds to the load increase signal with a switch-on delay time by the engine to the air-conditioning compressor, firstly for an air-conditioning compressor with the highest priority, and then, after a predefined time, for an air-conditioning compressor with the next highest priority.

11. The method of claim 10, and further comprising checking whether a deactivating switch for deactivation of the air-conditioning unit has been operated during the switch-on delay time, switching off all the air-conditioning compressors of the associated cooling circuit and again determining whether the engine is newly started when the deactivating switch has been operated, and, otherwise, when an air-conditioning compressor with the next highest priority is present, again outputting the air-conditioning compressor actuating signal and the anticipated air-conditioning compressor torque to the engine control device.

12. The method of claim 11, and further comprising switching the air-conditioning compressor off over a predetermined time period when the acceleration bit is set, monitoring whether the acceleration bit remains set, speeding up the air-conditioning compressor immediately and with a predefined gradient when the acceleration bit is no longer set, ending the deactivation of the air-conditioning compressor over the predetermined time period and powering up the air-conditioning compressor again with the predefined gradient when the acceleration bit remains set, and repeating the switching, monitoring, speeding up and ending acts for the air-conditioning compressor with the next highest priority.

13. The method of claim 12, and further comprising determining the external temperature before switching the air-conditioning compressor off and deciding whether the external temperature is above a predetermined threshold value, selecting the predetermined time period as a function of whether the external temperature is above or below the threshold value, and determining the gradient during speeding up or powering up of the air-conditioning compressor depending on whether the external temperature is above the threshold value.

14. The method of claim 10, and further comprising switching the air-conditioning compressor off over a predetermined time period when the acceleration bit is set, monitoring whether the acceleration bit remains set, speeding up the air-conditioning compressor immediately and with a predefined gradient when the acceleration bit is no longer set, ending the deactivation of the air-conditioning compressor over the predetermined time period and powering up the air-conditioning compressor again with the predefined gradient when the acceleration bit remains set, and repeating the switching, monitoring, speeding up and ending acts for the air-conditioning compressor with the next highest priority.

15. The method of claim 14, and further comprising determining the external temperature before switching the air-conditioning compressor off and deciding whether the external temperature is above a predetermined threshold value, selecting the predetermined time period as a function of whether the external temperature is above or below the threshold value, and determining the gradient during speeding up or powering up of the air-conditioning compressor depending on whether the external temperature is above the threshold value.

16. The method of claim 1, and further comprising switching the air-conditioning compressor off over a predetermined time period when the acceleration bit is set, monitoring whether the acceleration bit remains set, speeding up the air-conditioning compressor immediately and with a predefined gradient when the acceleration bit is no longer set, ending the deactivation of the air-conditioning compressor over the predetermined time period and powering up the air-conditioning compressor again with the predefined gradient when the acceleration bit remains set, and repeating the switching, monitoring, speeding up and ending acts for the air-conditioning compressor with the next highest priority.

17. The method of claim 16, and further comprising determining the external temperature before switching the air-conditioning compressor off and deciding whether the external temperature is above a predetermined threshold value, selecting the predetermined time period as a function of whether the external temperature is above or below the threshold value, and determining the gradient during speeding up or powering up of the air-conditioning compressor depending on whether the external temperature is above the threshold value.

18. The method of claim 1, wherein the determining acts are carried out in a different sequence.

19. The method of claim 1, wherein the determining acts are carried out simultaneously.

* * * * *